United States Patent
Yamaoka

(10) Patent No.: US 12,452,944 B2
(45) Date of Patent: Oct. 21, 2025

(54) WIRELESS COMMUNICATION CONTROL DEVICE, WIRELESS COMMUNICATION DEVICE, AND WIRELESS COMMUNICATION CONTROL METHOD

(71) Applicant: DENSO CORPORATION, Kariya (JP)

(72) Inventor: Kousuke Yamaoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 128 days.

(21) Appl. No.: 18/306,443

(22) Filed: Apr. 25, 2023

(65) Prior Publication Data

US 2023/0262812 A1  Aug. 17, 2023

Related U.S. Application Data

(63) Continuation of application No. PCT/JP2021/039511, filed on Oct. 26, 2021.

(30) Foreign Application Priority Data

Nov. 25, 2020  (JP) .................................. 2020-195376

(51) Int. Cl.
*H04W 84/12* (2009.01)
*H04W 24/08* (2009.01)
(Continued)

(52) U.S. Cl.
CPC ........... *H04W 76/16* (2018.02); *H04W 28/04* (2013.01); *H04W 76/20* (2018.02); *H04W 88/06* (2013.01)

(58) Field of Classification Search
CPC ..... H04W 76/16; H04W 28/04; H04W 76/20; H04W 88/06; H04W 72/1215; H04W 84/12; H04W 4/00; H04W 24/08
See application file for complete search history.

(56) References Cited

U.S. PATENT DOCUMENTS

| | | | |
|---|---|---|---|
| 10,917,820 B2 * | 2/2021 | Jung | H04W 72/27 |
| 11,006,258 B2 * | 5/2021 | Harada | H04W 40/12 |

(Continued)

FOREIGN PATENT DOCUMENTS

| | | |
|---|---|---|
| JP | 2006262176 A | 9/2006 |
| JP | 2019106721 A | 6/2019 |
| KR | 20150079102 A | 7/2015 |

OTHER PUBLICATIONS

Y. Shibata, K. Ito and N. Uchida, "A New V2X Communication System to Realize Long Distance and Large Data Transmittion by N-Wavelength Wireless Cognitive Network," 2018 IEEE 32nd International Conference on Advanced Information Networking and Applications (AINA), Krakow, Poland, 2018, pp. 587-592 (Year: 2018).*

(Continued)

*Primary Examiner* — Ayman A Abaza
*Assistant Examiner* — Tracy L Williams
(74) *Attorney, Agent, or Firm* — Harness, Dickey & Pierce, P.L.C.

(57) ABSTRACT

A control unit is for controlling a wireless communication device usable in a mobile body. The wireless communication device is configured to use first line and second line which are different for a connection to a wireless network, and to transmit and receive data to and from the wireless network via wireless communication. The wireless communication device includes: a data communication processor for performing data communication, which is transmission of data on the first line; and a communication controller for performing communication control for sharing a communication status indicating a progress of data transmission between a transmission source and a transmission destination.

11 Claims, 8 Drawing Sheets

(51) Int. Cl.
*H04W 28/04* (2009.01)
*H04W 76/16* (2018.01)
*H04W 76/20* (2018.01)
*H04W 88/06* (2009.01)

(56) References Cited

U.S. PATENT DOCUMENTS

| | | | | |
|---|---|---|---|---|
| 11,477,806 | B2* | 10/2022 | Otaka | H04W 28/0226 |
| 11,671,882 | B2* | 6/2023 | Andou | H04W 52/0274 |
| | | | | 370/331 |
| 2008/0046542 | A1* | 2/2008 | Sano | H04W 36/305 |
| | | | | 709/218 |
| 2011/0158212 | A1* | 6/2011 | Sakai | H04W 8/005 |
| | | | | 455/509 |
| 2013/0034001 | A1* | 2/2013 | Mizusawa | H04W 16/14 |
| | | | | 370/252 |
| 2016/0270143 | A1* | 9/2016 | Tachikawa | H04W 48/08 |
| 2017/0027008 | A1* | 1/2017 | Krishnamoorthy | |
| | | | | H04L 67/1072 |
| 2017/0135151 | A1* | 5/2017 | Fujishiro | H04W 72/04 |
| 2018/0007624 | A1* | 1/2018 | Tong | H04W 4/02 |
| 2019/0037433 | A1 | 1/2019 | Nagasaka et al. | |
| 2021/0204175 | A1* | 7/2021 | Rangaraju | H04W 12/037 |
| 2023/0199886 | A1* | 6/2023 | Wang | H04W 76/16 |
| | | | | 370/329 |

OTHER PUBLICATIONS

W. Xibin, W. Junhong, Y. Chao, P. Mengqin, Z. miao and G. Xuze, "Design of wireless remote data acquisition system based on three layer network Wireless," 2018 Chinese Automation Congress (CAC), Xi'an, China, 2018, pp. 504-507 (Year: 2018).*

* cited by examiner

FIG. 3

| DATA WAITING FOR TRANSMISSION | TRANSMISSION STATE | UDP TRANSMISSION BLOCK | BLOCK TRANSMISSION STATUS |
|---|---|---|---|
| Data_ID#1 | TRANSMISSION INTERRUPTED | ID#1_Block#1 | COMPLETE |
| | | ID#1_Block#2 | COMPLETE |
| | | ID#1_Block#3 | INCOMPLETE |
| Data_ID#2 | WAITING FOR TRANSMISSION | ID#2_Block#1 | INCOMPLETE |
| | | ID#2_Block#2 | INCOMPLETE |
| Data_ID#3 | WAITING FOR TRANSMISSION | ID#3_Block#1 | INCOMPLETE |
| ... | ... | ... | ... |

WIRELESS COMMUNICATION CONTROL DEVICE, WIRELESS COMMUNICATION DEVICE, AND WIRELESS COMMUNICATION CONTROL METHOD

CROSS REFERENCE TO RELATED APPLICATION

The present application is a continuation application of International Patent Application No. PCT/JP2021/039511 filed on Oct. 26, 2021, which designated the U.S. and claims the benefit of priority from Japanese Patent Application No. 2020-195376 filed in Japan on Nov. 25, 2020. The entire disclosures of all of the above applications are incorporated herein by reference.

TECHNICAL FIELD

The present disclosure relates to a wireless communication control device, a wireless communication device, and a wireless communication control method.

BACKGROUND

A technique is known that enables wireless communication even in vehicles by using wide-area wireless communication using a mobile phone network. For example, a wireless communication device used in a vehicle connects to a network via wireless communication with a wireless LAN access point such as Wi-Fi (registered trademark), and transmits and receives information. Vehicles move at high speeds, while wireless LAN access points have limited coverage. Therefore, when connecting to an access point around the vehicle at random, the connection is cut off as soon as the vehicle moves away from the access point, and thereby causing a problem of ineffective wireless communication.

SUMMARY

According to an aspect of the present disclosure, a wireless communication control device or a wireless communication control method is for controlling a wireless communication device. The wireless communication device is configured to perform transmission and reception of data with a wireless network usable in a mobile body via wireless communication, by using a first line and a second line both connected to the wireless network with respectively different communication methods.

The wireless communication control device may include: a data communication processor configured to perform data communication, which is data transmission on the first line; and a communication controller configured to perform, on the second line, communication control for a sharing of a communication status that indicates a progress of data transmission between a transmission source and a transmission destination of the data communication.

The wireless communication control method may include a step of performing data communication as data transmission on the first line, and a step of performing a communication control for a sharing of a communication status indicating a progress of data transmission between a transmission source and a transmission destination of the data communication, on the second line.

BRIEF DESCRIPTION OF DRAWINGS

The objects, features and advantages of the present disclosure will become more apparent from the following detailed description made with reference to the accompanying drawings. In the drawings:

FIG. 3 is a diagram showing an example of a schematic configuration of a control unit;

DESCRIPTION OF EMBODIMENTS

Figure 1:
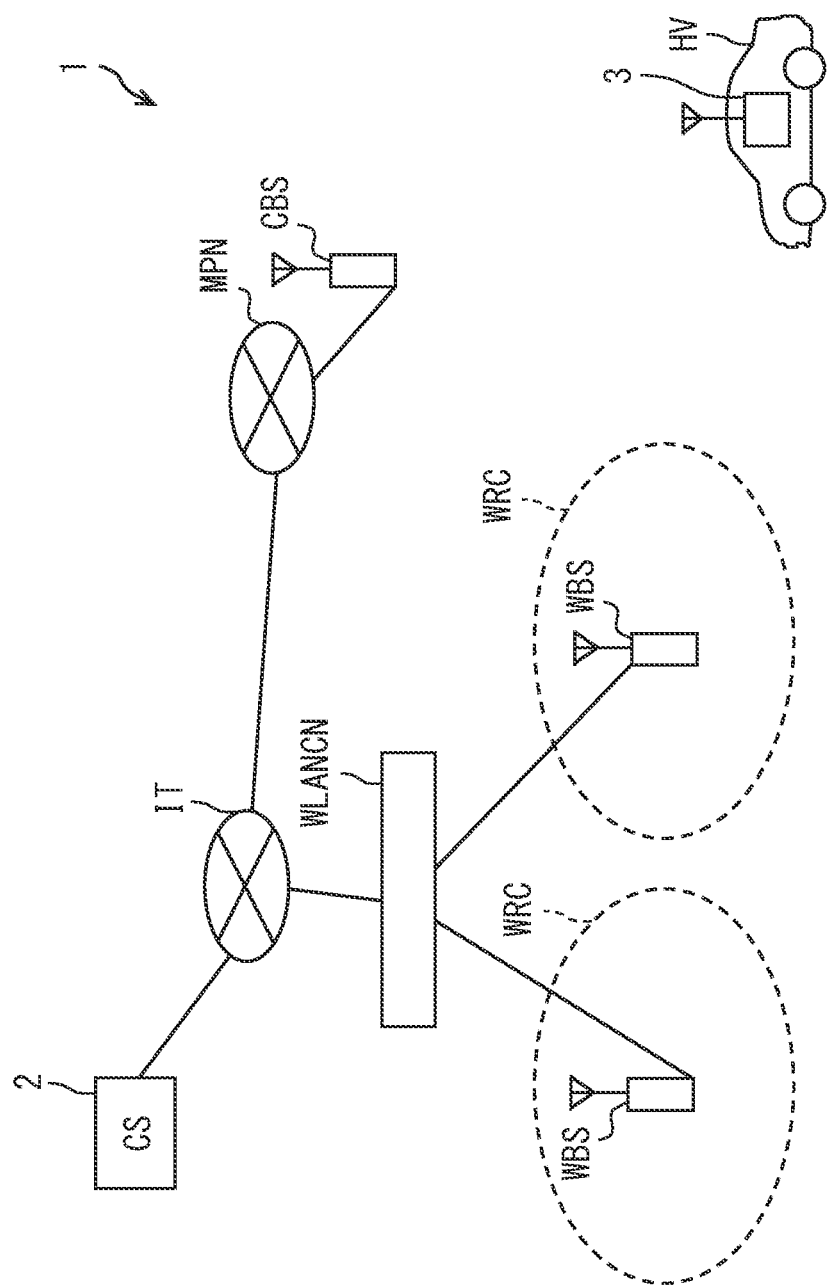
FIG. 1 is a diagram showing an example of a schematic configuration of a vehicle communication system.

For example, when there are multiple wireless base stations (that is, access points) in a traveling direction of a vehicle, after selecting a wireless base station within a predetermined distance range from among the wireless base stations, a farther-away wireless base station is selected as a connection destination from among the wireless base stations. This technique attempts to secure a longer connection time to one access point by selecting the farthest access point from the vehicle as a connection destination when there are multiple access points in the traveling direction of the vehicle.

Though wide-area wireless communication using a mobile phone network (hereinafter referred to as cellular communication) is considered to have higher communication reliability than wireless LAN, an increase in communication costs due to an increase in communication data is a problem. The problem of increased communication costs becomes more serious as the transfer efficiency of communication data is increased.

Wireless LAN has a lower communication cost than the cellular communication, but has a problem of lower reliability of communication. The details are described as follows. While the vehicle is moving, it is difficult to predict a timing of when wireless communication is disabled, because the radio wave conditions vary depending on the travel environment. If wireless communication becomes disabled at an unpredictable timing, the communication connection is cut in the middle of the communication. In the wireless LAN, even when the communication is interrupted in the middle of the communication, the connection remains until a non-communication timeout occurs, and there arises a problem that the communication cannot be immediately restarted at the time of reconnection. Further, in a wireless LAN, if communication is interrupted in the middle of communication, intermediate data in the middle of communication remains on a communication partner side in a state in which the transmission status is unknown. In such case, the memory capacity of the communication partner may become smaller, or the transmitted data may have to be retransmitted.

It is an object of the present disclosure to provide a wireless communication control device, a wireless communication device and a wireless communication control method, which enable reduction of communication costs and improvement of data transfer efficiency while suppressing deterioration of communication reliability in communication with a wireless network in a mobile body.

The above object is achieved by a combination of features described in an independent claim, and sub-claims define further advantageous embodiments of the present disclosure. The technical scope of the present disclosure is not necessarily limited thereto.

In order to achieve the above object, a wireless communication control device of the present disclosure is for controlling a wireless communication device that is configured to perform transmission and reception of data with a wireless network usable in a mobile body via wireless communication, by using a first line and a second line both connected to the wireless network with respectively different communication methods. The wireless communication control device includes: a data communication processor configured to perform data communication, which is data transmission on the first line; and a communication controller configured to perform, on the second line, communication control for a sharing of a communication status that indicates a progress of data transmission between a transmission source and a transmission destination of the data communication.

Further, in order to achieve the above object, a wireless communication control method is performable by at least one processor and usable in a mobile body, for controlling a wireless communication device. The wireless communication device is configured to (i) use first and second lines that are different for a connection to a wireless network and (ii) to transmit and receive data to and from the wireless network via wireless communication. The wireless communication control method includes: a data communication processing step for performing data communication, as data transmission on the first line; and a communication control step for performing a communication control for a sharing of a communication status indicating a progress of data transmission between a transmission source and a transmission destination of the data communication, on the second line.

According to the above configuration, the communication control may be performed for a sharing of the communication status indicating a progress of data transmission between the transmission source and the transmission destination by using the second line that is a different line from the first line dedicated for the data communication. Therefore, it is possible to share the communication status using a line with higher stability than a line for data communication. Thus, even when data communication is interrupted in the middle, it is possible to increase the possibility of sharing the communication status. As a result, it becomes easier to avoid problems due to the inability to share the communication status, and it is possible to suppress deterioration in reliability of communication. Thus, even when the data transfer efficiency is increased by using a line with a lower communication cost as a line for performing data communication, it is possible to suppress deterioration in reliability of communication. As a result, it is possible to reduce the communication cost and improve the data transfer efficiency while suppressing deterioration in reliability of communication when performing communication for a mobile body via the wireless network.

Further, in order to achieve the above object, a wireless communication device of the present disclosure is configured to be used in a mobile body, to connect to a wireless network via wireless communication, and to transmit and receive data, using either a first line or a second line having respectively different communication methods. The wireless communication device includes a first communication unit connecting to the wireless network using the first line, a second communication unit connecting to the wireless network using the second line, and the wireless communication control device described above.

According to the above, since the wireless communication control device described above is included, it is possible for the mobile body to reduce the communication cost and improve the data transfer efficiency while suppressing the deterioration of reliability in communication with the wireless network.

Multiple embodiments of the present disclosure are described with reference to the drawings. For convenience of description, among multiple embodiments, a configuration having the same function as a configuration shown in the drawing and described in the previous embodiment may be indicated by the same reference symbol, and the description thereof may be omitted. For the configuration having the same reference symbol as in the previous embodiment, detailed description may be omitted in other embodiments.

First Embodiment

<Schematic Configuration of Vehicle Communication System 1>

Hereinafter, a present embodiment is described with reference to the drawings. First, a vehicle communication system 1 is described with reference to FIG. 1. As shown in FIG. 1, a vehicle communication system 1 includes a center server (CS) 2 and a wireless communication device 3. WBS in FIG. 1 indicates a wireless LAN base station. That is, the base station WBS corresponds to an access point of the wireless LAN. Hereinafter, an access point may be abbreviated as AP. As the wireless LAN, Wi-Fi (registered trademark) is named, for example. When the wireless LAN is Wi-Fi, the base station WBS corresponds to a Wi-Fi spot. WRC in FIG. 1 indicates a communication range of the base station WBS. WLANCN in FIG. 1 indicates a wireless LAN controller. The wireless LAN controller is a controller that manages a plurality of base stations WBS. A wireless LAN controller is connected to the Internet and a plurality of base stations WBS, for example. CBS in FIG. 1 indicates a base station for cellular communication. IT in FIG. 1 indicates the Internet. An MPN in FIG. 1 indicates a mobile phone network.

The CS 2 is a server that receives upload data from the wireless communication device 3. The CS 2 is assumed to be connected to the Internet, for example. The CS 2 may consist of one server, or may consist of a plurality of servers. The CS 2 may be, for example, a server on the cloud, or may be a distributed network such as a block chain or the like.

The wireless communication device 3 can be used in a vehicle HV. In the present embodiment, the following description is made on an assumption that the wireless communication device 3 is used in the vehicle HV. The wireless communication device 3 uploads data to the CS 2 via wireless communication. The wireless communication device 3 communicates with the CS 2 connected to a public communication network, via the public communication network and base stations. The public communication network includes the above-mentioned Internet IT and the mobile phone network MPN. The wireless communication device 3 is capable of using two types of access methods for accessing the CS 2.

The first access method uses a wireless LAN to connect to a wireless LAN base station WBS and connect to the CS 2 via the Internet IT. A line used in this first access method is called as a first line. In the first access method, the Internet IT corresponds to a wireless network. When using Wi-Fi as the wireless LAN, the first line corresponds to the Wi-Fi line.

The second access method uses cellular communication to connect to the base station CBS and connect to the CS 2 through the mobile phone network MPN and the Internet IT. A line used in this second access method is called as a second line. In the second access method, the mobile phone network MPN and the Internet IT respectively correspond to a wireless network. When the wireless communication device 3 connects directly to the base station CBS, the second line corresponds to a cellular line. In the following, a case in which the wireless communication device 3 is directly connected to the base station CBS is described as an example.

The wireless communication device 3 performs data communication on the first line, as a transmission of data. On the other hand, the wireless communication device 3 performs communication control for sharing a communication status of data communication indicating a progress of data transmission between a transmission source and a transmission destination on the second line. In other words, the wireless communication device 3 splits the communication at least among two lines, i.e., performing data communication on the first line and performing communication control on the second line.

It may be preferable that a range connectable to the wireless network using the second line is wider than a range connectable to the wireless network using the first line. According to the above, even when the data communication on the first line is interrupted, the communication control by the second line is continuable, and the possibility of sharing the communication status with the destination of the data increases. The wireless network connectable range is an area in which connection with a base station of the wireless network is possible.

The second line may preferably be a line whose communication state is more stable than that of the first line. According to the above, even when the data communication on the first line is interrupted, the communication control on the second line is normally performable, and the possibility of sharing the communication status with the destination of the data increases. A stable communication state compared to the first line means that the frequency of data corruption, data loss, connection interruption, and the like is low compared to the first line. On the other hand, the first line may preferably be a line having a lower communication unit price than the second line. According to the above, it becomes possible to reduce the communication cost when transmitting data.

The second line may preferably be a line using a communication protocol capable of at least one of arrival confirmation and error correction. According to the above, it becomes possible to more reliably perform communication control on the second line. For example, the second line may be configured to use TCP (Transmission Control Protocol). TCP performs connection-oriented communication that secures a virtual communication path with a communication partner before starting communication. TCP has sequence control, retransmission control, and flow control. On the other hand, the first line may preferably be a line using a communication protocol with higher data transfer efficiency than the second line. According to the above, it is possible to efficiently transfer data even when the vehicle HV is locally connected to the access point of the first line for a relatively short period of time during a travel of the vehicle HV. For example, the first line may be configured to use UDP (User Datagram Protocol). UDP performs connectionless communication without prior communication with a communication partner before starting communication. UDP has a small header overhead. UDP does not have rate control (i.e., transmission amount control) such as a slow start algorithm or the like.

In the following description, a case in which the first line is a Wi-Fi line and UDP is used is described as an example. Regarding the second line, a case in which the second line is a cellular line such as LTE and TCP is used is described as an example. Note that the first line and the second line do not have to be a combination of a Wi-Fi line and a cellular line as long as they satisfy any of the above-described conditions.

<Schematic Configuration of Wireless Communication Device 3>

Figure 2:
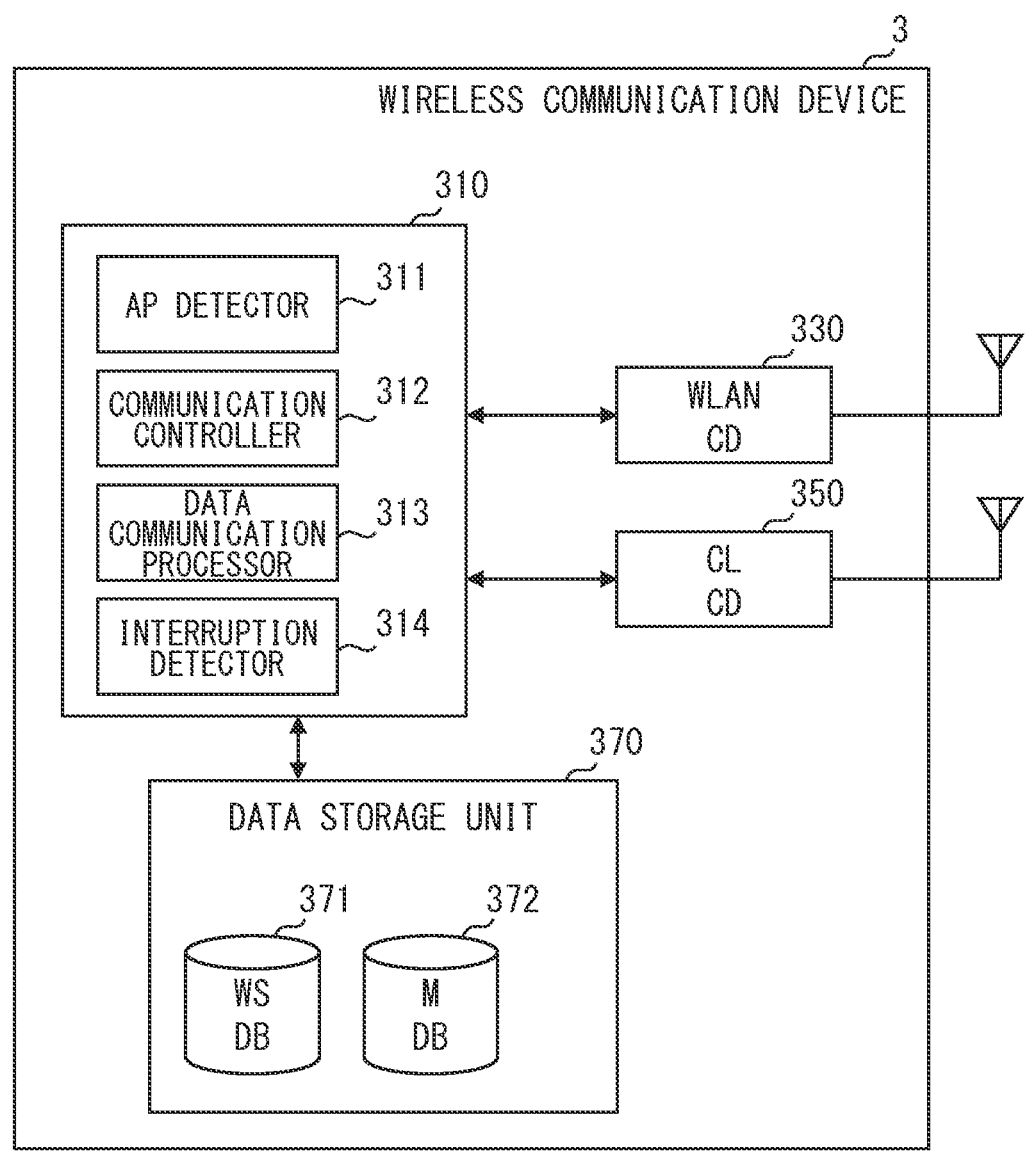
FIG. 2 is a diagram showing an example of a schematic configuration of a wireless communication device.

Next, a schematic configuration of the wireless communication device 3 is described with reference to FIG. 2. As shown in FIG. 2, the wireless communication device 3 includes a control unit 310, a wireless LAN communication unit (hereinafter referred to as WLAN communication unit) 330, a cellular communication unit (hereinafter referred to as CL communication unit) 350 and a data storage unit 370. The WLAN communication unit 330 is indicated as WLANCD in FIG. 2. The CL communication unit 350 is indicated as CLCD in FIG. 2.

The WLAN communication unit 330 connects to the base station WBS and performs wireless communication. The WLAN communication unit 330 communicates with the CS 2 connected to Internet IT via the base station WBS. Such a communication is hereinafter referred to as wireless LAN communication. Note that the WLAN communication unit 330 corresponds to a first communication unit. The wireless LAN communication is possible within a communication range WRC of the base station WBS. In the example of the present embodiment, the wireless LAN communication corresponds to Wi-Fi communication.

The CL communication unit 350 connects to the base station CBS and performs wireless communication. The CL communication unit 350 communicates with the CS 2 via the base station CBS, the mobile phone network MPN, and the Internet IT. That is, the CL communication unit 350 communicates by connecting with the cellular network. Such a communication is hereinafter referred to as cellular communication. Note that the CL communication unit 350 corresponds to a second communication unit. The cellular communication includes LTE (Long Term Evolution) and the like. When the wireless communication device 3 adopts a configuration in which it indirectly connects to the base station CBS via a mobile terminal, the CL communication unit 350 may be configured to connect to the base station CBS by Bluetooth tethering, for example.

The data storage unit 370 stores various information. A non-volatile memory may be used as the data storage unit 370. The data storage unit 370 may be made of one memory, or may be made of a plurality of memories. The data storage unit 370 has a transmission waiting database (hereinafter referred to as WSDB) 371 and a transmission state management database (hereinafter referred to as MDB) 372.

The WSDB 371 is a database that stores data that needs to be transmitted (hereinafter referred to as transmission data). Transmission data is upload transmission target data to the CS 2. The upload data is generated by an ECU of the vehicle HV. The upload data is also generated by an application in the wireless communication device 3. The WSDB 371 temporarily stores the upload data until transmission of the upload data is complete.

The MDB 372 is a database for managing the communication status indicating the progress of current data transmission for each of the transmission data stored in the WSDB 371. The communication status includes a transmission state or/and a transmission status. The transmission state includes stages such as "waiting for transmission," "transmitting," and "transmission interrupted." The transmission status indicates how far the data has been transmitted. An example of the transmission status may be the presence or absence of completion of transmission for each block when data is divided into a plurality of blocks and transmitted. Hereinafter, a UDP transmission unit obtained by dividing one piece of data is called a block.

An example of the communication status stored in the MDB 372 is now described with reference to FIG. 3. FIG. 3 is a diagram for explaining an example of communication statuses stored in the MDB 372. In the MDB 372, transmission data is managed by assigning an ID (hereinafter referred to as data ID) for each data such as "Data_ID #1" and the like. In the MDB 372, each data ID is associated with a transmission state such as "waiting for transmission," "transmitting," "transmission interrupted" or the like. Further, in the MDB 372, each block of transmission data is managed by assigning an ID (hereinafter referred to as a block ID) for each block such as "ID #1_Block #1" and the like. In the MDB 372, a transmission status such as "complete" or "incomplete" is associated with each block ID. As an example, transmission data may be managed by arranging them in order of transmission priority.

The control unit 310 includes, for example, a processor, memory, I/O, and a bus connecting these, and executes various processes related to wireless communication control by executing a control program stored in the memory. The memory mentioned here is a non-transitory, tangible storage medium, and stores programs and data that can be read by a computer. The non-transitory, tangible storage medium is implemented by a semiconductor memory or the like. Details of the control unit 310 are described below.

<Schematic Configuration of Control Unit 310>

Next, a schematic configuration of the control unit 310 is described with reference to FIG. 2. As shown in FIG. 2, the control unit 310 includes an AP detector 311, a communication controller 312, a data communication processor 313, and an interruption detector 314 as functional blocks. Part or all of the functions performed by the control unit 310 may be configured as hardware using one or a plurality of ICs or the like. Also, part or all of the functional blocks provided by the control unit 310 may be implemented by a combination of software executed by a processor and hardware members. The control unit 310 corresponds to a wireless communication control device. Execution of the processing of each of the functional blocks of the control unit 310 by the computer corresponds to a process performing the wireless communication control method.

The AP detector 311 detects an access point of the first line. In the example of the present embodiment, the base station WBS is detected. The AP detector 311 may detect the base station WBS by detecting an SSID (Service Set Identifier) of the base station WBS from the signal received by the WLAN communication unit 330. If the base station WBS does not exist within the communication range of the WLAN communication unit 330, the AP detector 311 does not detect the base station WBS because the WLAN communication unit 330 cannot receive the signal including the SSID of the base station WBS.

The communication controller 312 performs communication control for sharing the communication status on the second line. In the example of the present embodiment, communication control is performed to share the communication status on the cellular line. The processing in such communication controller 312 corresponds to a communication control step. Details of processing in the communication controller 312 are described later. The data communication processor 313 performs data communication, which is data transmission performed on the first line. In the example of the present embodiment, data communication is performed on a Wi-Fi line. The processing in the data communication processor 313 corresponds to a data communication processing step. Details of the processing in the data communication processor 313 are described later. The interruption detector 314 detects interruption of data transmission on the first line, which is performed by the data communication processor 313.

<Transmission Related Processing>

Figure 4:
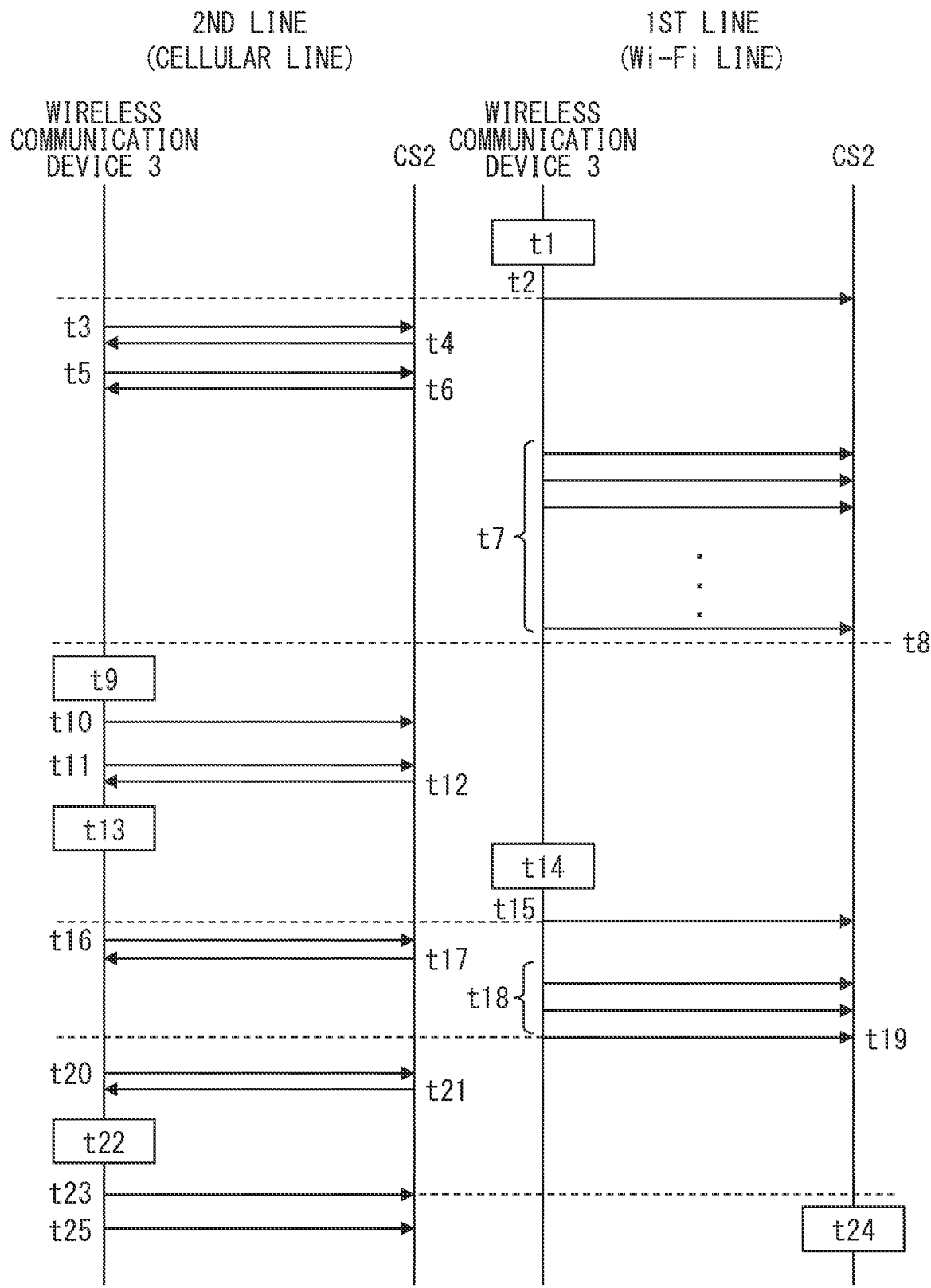
FIG. 4 is a sequence diagram showing an example of a flow of transmission related processing in the vehicle communication system.

Next, with reference to the sequence diagram of FIG. 4, an example of the flow of processing related to data transmission by parallel use of both of the Wi-Fi line and the cellular line in the vehicle communication system 1 (hereinafter referred to as transmission related processing) is described. The sequence diagram of FIG. 4 shows an example of the communication flow between the wireless communication device 3 and the CS 2 for each of the Wi-Fi line and the cellular line. FIG. 4 shows an example where transmission is interrupted before all blocks of data are transmitted.

First, at t1, AP detector 311 detects the base station WBS (that is, an access point) of the first line. Here, it is assumed that the base station WBS detected by the AP detector 311 is a connectable base station WBS for which a contract has been complete by the user of the vehicle HV. At t2, the base station WBS detected at t1 and WLAN communication unit 330 are connected. This enables communication on the Wi-Fi line.

At t3, the communication controller 312 establishes a connection for communication control between the CL communication unit 350 and the base station CBS. That is, when the AP detector 311 detects the base station WBS, the communication controller 312 establishes a connection for communication control (hereinafter referred to as a control connection) on the cellular line. According to the above, it is possible to reduce the waste of keeping the control connection always connected. At t4, the CS 2 sends an Ack indicating completion of preparation to CL communication unit 350 via the cellular line.

At t5, upon receiving the Ack at t4, the communication controller 312 causes the CL communication unit 350 to transmit a transmission start notice indicating the start of data transmission to the CS 2. The transmission start notice is transmitted on the cellular line. At t6, the CS 2 sends an Ack indicating the maximum transfer rate of data communication to the CL communication unit 350 via the cellular line as a response to the transmission start notice.

At t7, the data communication processor 313 causes the WLAN communication unit 330 to sequentially transmit the blocks of data waiting for transmission on the Wi-Fi line at a transfer rate equal to or lower than the maximum transfer rate given in the response at t6. At t8, the wireless communication device 3 is positioned outside the communication range WRC of the base station WBS due to travel of the vehicle HV, and the connection between the base station WBS and the WLAN communication unit 330 is cut. As a result, data transmission from the WLAN communication unit 330 is interrupted. The control unit 310 may detect a state in which the connection between the base station WBS and the WLAN communication unit 330 is about to be cut, and may interrupt data transmission. The area outside the communication range WRC of the base station WBS is out of Wi-Fi service area.

At t9, the interruption detector 314 detects interruption of data transmission. At t10, in response to the detection of the data transmission interruption at t9, the communication controller 312 causes the CL communication unit 350 to transmit a transmission interruption notice of the data transmission interruption to the CS 2. In other words, when the interruption detector 314 detects interruption of data transmission, the communication controller 312 notifies the data transmission destination of the interruption of data transmission on the Wi-Fi line using the cellular line. This enables the CS 2 to recognize that the data transmission is being interrupted.

At t11, the communication controller 312 causes the CL communication unit 350 to transmit a reception status confirmation notice for confirming a data reception status to the CS 2. That is, when the communication controller 312 detects that the data transmission is interrupted by the interruption detector 314, the communication controller 312 uses the cellular line to notify the data transmission destination of the confirmation of the reception status of the data. At t12, the CS 2 sends an Ack indicating the reception status to the CL communication unit 350 via the cellular line as a response to the reception status confirmation notice.

At t13, the control unit 310 updates the communication status stored in MDB 372 according to the reception status response received at t12. For example, the transmission state that was "waiting for transmission" before the start of data transmission is updated to "transmission interrupted." Further, the transmission status indicated as "incomplete" for all blocks of data before the start of data transmission is updated and changed to "complete" for the blocks that have already been indicated as received in the reception status response.

At t14, the AP detector 311 detects the base station WBS of the Wi-Fi line in the same manner as at t1. At t15, the base station WBS detected at t2 and WLAN communication unit 330 are connected. This enables communication on the Wi-Fi line.

At t16, the communication controller 312 detects the connection between the base station WBS and the WLAN communication unit 330, and causes the CL communication unit 350 to transmit a transmission restart notice indicating restart of data transmission to the CS 2. The transmission restart notice is transmitted on the cellular line. At t17, the CS 2 sends an Ack indicating the maximum transfer rate of data communication to the CL communication unit 350 on the cellular line as a response to the transmission restart notice.

At t18, the data communication processor 313 causes the WLAN communication unit 330 to sequentially transmit the data blocks indicated as transmission interrupted, i.e., blocks indicated as "transmission incomplete" at a transfer rate equal to or lower than the maximum transfer rate given in the response at t6 on the Wi-Fi line. In other words, when data transmission using the Wi-Fi line becomes restartable, the data communication processor 313 transmits, to the transmission destination, the unreceived data (i.e., remains of data) at the transmission destination identifiable from the reception status response received by the communication controller 312 using the Wi-Fi line. According to the above, it is possible to eliminate the waste of retransmitting data that has already been transmitted, and to transmit only the remaining data that has not been received by the transmission destination. At t19, the transmission of all blocks of data for which transmission has been interrupted is complete.

At t20, the communication controller 312 causes the CL communication unit 350 to transmit a reception status confirmation notice for confirming the reception status of the data to the CS 2. At t21, the CS 2 sends an Ack indicating the reception status (hereinafter referred to as reception status response) to the CL communication unit 350 via the cellular line as a response to the reception status confirmation notice. Here, a reception status response indicating that reception of all blocks of data has been complete is returned in reply. The connection between the base station WBS and the WLAN communication unit 330 is cut when the wireless communication device 3 is positioned outside the communication range WRC of the base station WBS due to travel of the vehicle HV.

At t22, the control unit 310 updates the communication status stored in MDB 372 according to the reception status response received at t21. For example, the CS 2 may erase the communication status of data for which all blocks have been received.

At t23, the communication controller 312 causes the CL communication unit 350 to transmit a transmission complete notice indicating that data transmission has been complete to the CS 2. The transmission complete notice is transmitted on the cellular line. At t24, the CS 2 receives the transmission complete notice and reconstructs the data from all blocks of received data. At t25, the communication controller 312 cuts the control connection on the cellular line. Further, the process of t24 and the process of t25 may be performed in parallel, and the order may be reversed.

<Server-State Confirmation Related Processing>

Figure 5:
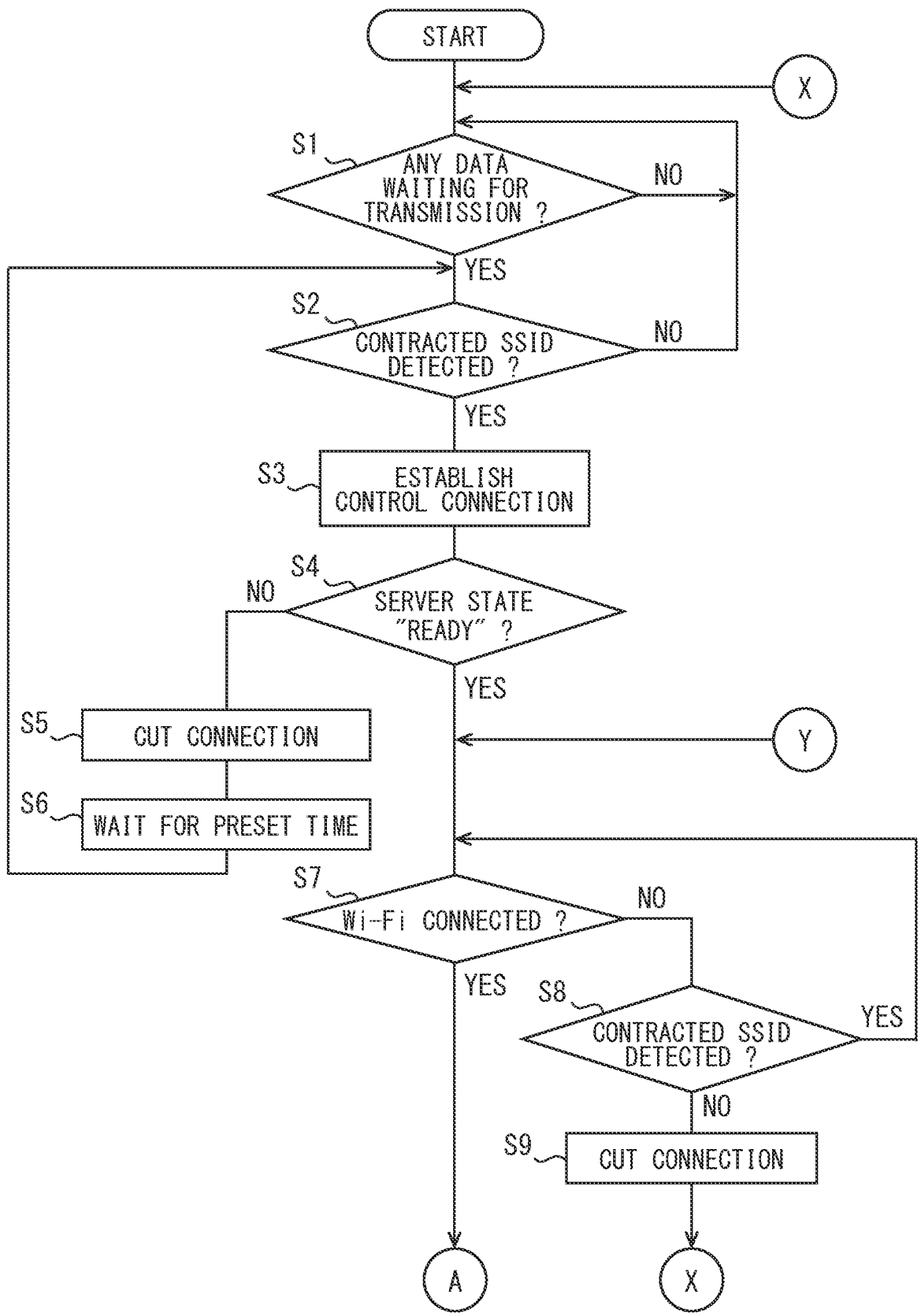
FIG. 5 is a flowchart showing an example of a flow of server-state confirmation related processing in the control unit.

Next, an example of the flow of processing related to confirmation of the state of the CS 2 using the cellular line by the control unit 310 (hereinafter referred to as server-state confirmation related processing) is described with reference to the flowchart of FIG. 5. The flowchart of FIG. 5 may be configured to start when, for example, the wireless communication device 3 is powered on and a control connection has not been established on the Wi-Fi line. It should be noted that the server-state confirmation related processing may end when the power of the wireless communication device 3 is turned off.

First, in step S1, the control unit 310 confirms the communication status stored in the MDB 372. If there is data waiting for transmission (YES in S1), the process proceeds to step S2. On the other hand, if there is no data waiting for transmission (NO in S1), the process returns to S1 and repeats itself.

In step S2, the AP detector 311 detects the base station WBS of the Wi-Fi line. If the detected SSID of the base station WBS is the SSID contracted by the user of the vehicle HV (hereinafter referred to as contracted SSID) (YES in S2), the process proceeds to step S3. On the other hand, if the SSID is not the contracted SSID (NO in S2), the process returns to S1 and repeats itself.

In step S3, the communication controller 312 establishes a control connection between the CL communication unit 350 and the base station CBS. In the example of the present embodiment, this control connection is a TCP connection.

In step S4, the communication controller 312 inquires about the server state to the CS 2 using the cellular line. As for the server state, "busy" is a state in which communication is impossible, and "ready" is a state in which communication is possible. If the inquired server state is "ready" (YES in S4), the process proceeds to step S7. On the other hand, if the inquired server state is "busy" (NO in S4), the process proceeds to step S5.

In step S5, the communication controller 312 cuts the control connection between the CL communication unit 350 and the base station CBS. In step S6, it waits for a preset time, returns to S2, and repeats the processing. The preset time referred to here may be a time that can be arbitrarily set.

In step S7, the communication controller 312 confirms a connection state between the base station WBS and the WLAN communication unit 330. Then, when it is in a Wi-Fi connected state in which the base station WBS and the WLAN communication unit 330 are connected (YES in S7), the process proceeds to step S21 of data transmission related processing, which is described later. On the other hand, when it is in a Wi-Fi unconnected state in which the base station WBS and the WLAN communication unit 330 are not connected to each other (NO in S7), the process proceeds to step S8.

In step S8, the AP detector 311 detects the base station WBS of the Wi-Fi line. If the detected SSID of the base station WBS is a contracted SSID (YES in S8), the processing is repeated after returning to S7. On the other hand, if the SSID is not the contracted SSID (NO in S8), the process proceeds to step S9. In step S9, the communication controller 312 cuts the control connection between the CL communication unit 350 and the base station CBS, returns to S1, and repeats the processing.

As described above, by confirming the server state using the cellular line separately from the Wi-Fi connection, the reliability and efficiency of the data communication during the Wi-Fi connection can be improved.

<Data Transmission Related Processing>

Figure 6:
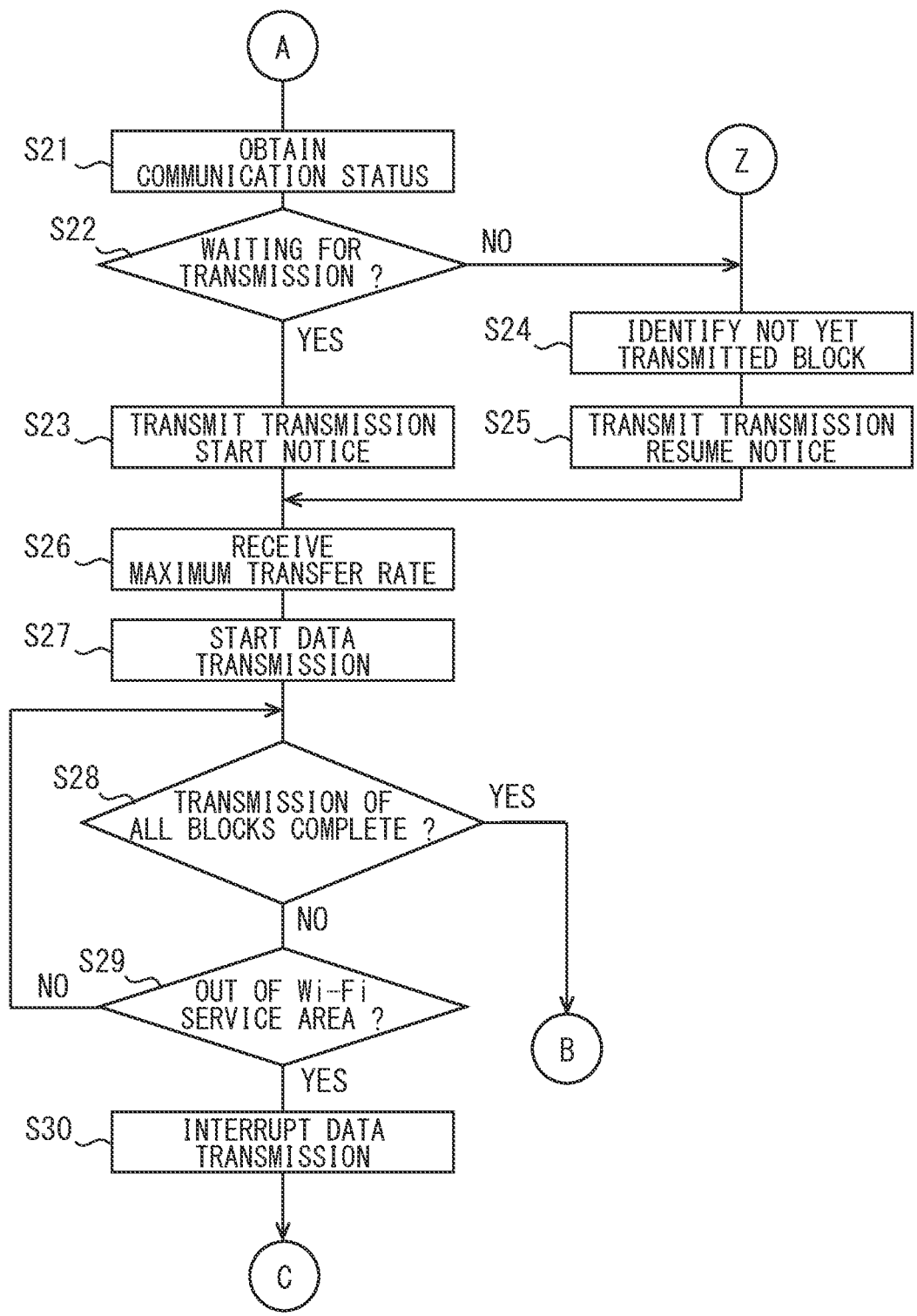
FIG. 6 is a flowchart showing an example of a flow of data transmission related processing in the control unit.

Next, an example of the flow of processing related to data transmission using the Wi-Fi line by the control unit 310 (hereinafter referred to as data transmission related processing) is described with reference to the flowchart of FIG. 6. The flowchart of FIG. 6 is started following the processing of S7 of the server-state confirmation related processing.

First, in step S21, the communication controller 312 obtains the communication status of the transmission target data from the MDB 372, and confirms the transmission state. The transmission target data may be the transmission data with the highest transmission priority.

At step S22, if the transmission state of the transmission target data is "waiting for transmission" (YES at S22), the process proceeds to step S23. On the other hand, if the transmission state of the transmission target data is "transmission interrupted" (NO in S22), the process proceeds to step S24.

In step S23, the communication controller 312 causes the CL communication unit 350 to transmit a transmission start notice to the CS 2 using the cellular line, and the process proceeds to step S26. The transmission start notice may include information indicating new data and the data ID of the transmission target data.

In step S24, the control unit 310 identifies a block or blocks not yet transmitted based on the communication status obtained from the MDB 372. The control unit 310 may identify a block whose transmission status is "incomplete" among the blocks of the transmission target data as a not-yet transmitted block. In step S25, the communication controller 312 causes the CL communication unit 350 to transmit a transmission restart notice to the CS 2 using the cellular line, and the process proceeds to step S26. The transmission restart notice may include information indicating that transmission has been interrupted and the data ID of the transmission target data.

When the CS 2 receives the transmission start notice or the transmission restart notice, it returns the current maximum transfer rate in Wi-Fi communication as a response using the cellular line. In step S26, the communication controller 312 receives the maximum transfer rate returned from the CS 2 via the CL communication unit 350.

In step S27, the data communication processor 313 causes the WLAN communication unit 330 to transmit the transmission target data to the CS 2 using the Wi-Fi line. In S27, with the data transfer rate suppressed to the maximum transfer rate received in S26 or less, the transmission target data is sequentially transmitted block by block.

In step S28, if transmission of all blocks of the transmission target data is complete (YES in S28), the process proceeds to step S41 of arrival confirmation related processing, which is described later. On the other hand, if transmission of all blocks of the transmission target data is not complete yet (NO in S28), the process proceeds to step S29.

In step S29, when (a) a position of the mobile phone 310 is out of the Wi-Fi service area, or (b) it is detected that the mobile phone is exiting from the Wi-Fi service area (YES in S29), the process proceeds to step S30. On the other hand, if the mobile phone is not out of the Wi-Fi service area and it has not been detected that the mobile phone is out of the Wi-Fi service area (NO in S29), the process returns to S28, and repeats the processing. The position of the mobile phone being out of the Wi-Fi service area is detectable by the interruption detector 314 based on the cut (i.e., interruption) of the communication in the WLAN communication unit 330. Exiting from the Wi-Fi service area is detectable by the interruption detector 314 based on the deterioration of the received electric field strength from the base station WBS. In step S30, the data communication processor 313 stops or interrupts the transmission of the transmission target data from the WLAN communication unit 330, and the process proceeds to step S61 of the transmission interrupted time processing described later.

<Arrival Confirmation Related Processing>

Figure 7:
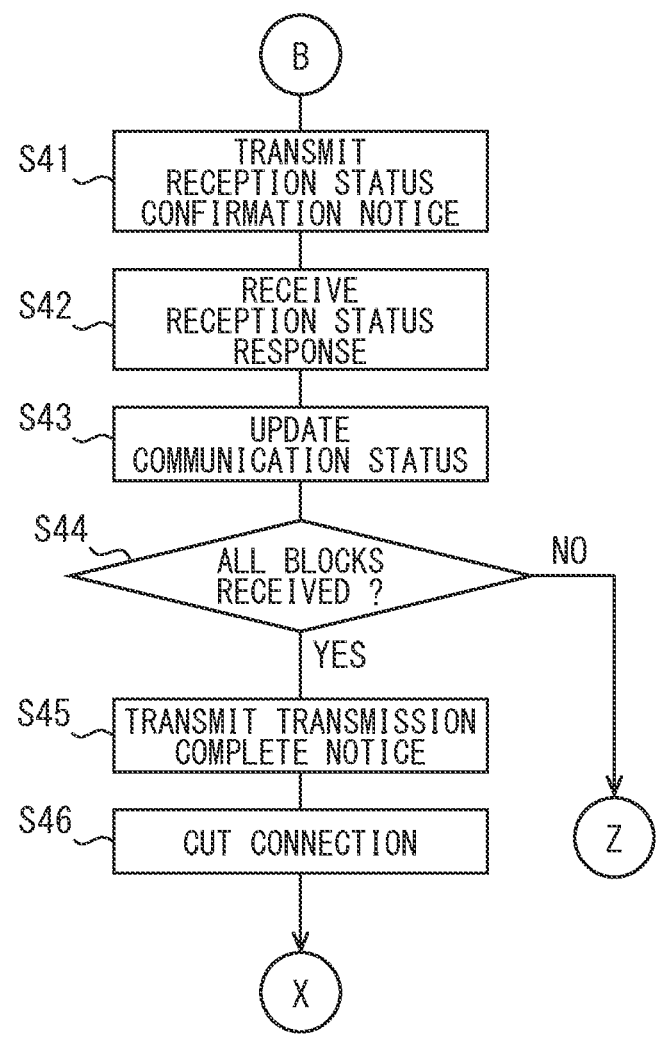
FIG. 7 is a flowchart showing an example of a flow of arrival confirmation related processing in the control unit.

Next, an example of the flow of processing related to data arrival confirmation using the cellular line by the control unit 310 (hereinafter referred to as arrival confirmation related processing) is described with reference to the flowchart of FIG. 7. The flowchart of FIG. 7 is started when YES in S28 of the data transmission related processing.

First, in step S41, the communication controller 312 causes the CL communication unit 350 to transmit a reception status confirmation notice to the CS 2 using the cellular line. The reception status confirmation notice may be a notice for confirming whether the CS 2 has received all blocks in transmission of transmission target data. The reception status confirmation notice may be a notice message including information such as a list of blocks constituting transmission target data and the like.

After receiving the reception status confirmation notice, the CS 2 compares the contents of the received block with the contents of the reception status confirmation notice. Then, the CS 2 sends a reply to the wireless communication device 3 using the cellular line as a reception status response, which reports the result of received blocks and unreceived blocks at the CS 2. In step S42, the communication controller 312 receives the reception status response via the CL communication unit 350.

In step S43, the control unit 310 updates the communication status stored in the MDB 372 according to the reception status response received in S42. Of the reception statuses stored in the MDB 372, the reception statuses of blocks that have become received blocks are updated from "incomplete" to "complete." Data having the reception status of all blocks being updated to "complete" may be erasable from the MDB 372, since the situation is interpretable as completion of data transmission.

In step S44, if all blocks of transmission target data have been received (YES in S44), the process proceeds to step S45. On the other hand, if there are still blocks of transmission target data that have not yet been received (NO in S44), the process proceeds to S24 of the data transmission related processing, and repeats the processing.

In step S45, the communication controller 312 causes the CL communication unit 350 to transmit the transmission complete notice to the CS 2 using the cellular line. The transmission complete notice may be a notice indicating that transmission of all blocks has been complete regarding transmission of the transmission target data. In step S46, the communication controller 312 cuts the control connection between the CL communication unit 350 and the base station CBS, returns to S1 of the server-state confirmation related processing, and repeats the processing.

<Transmission Interrupted Time Processing>

Figure 8:
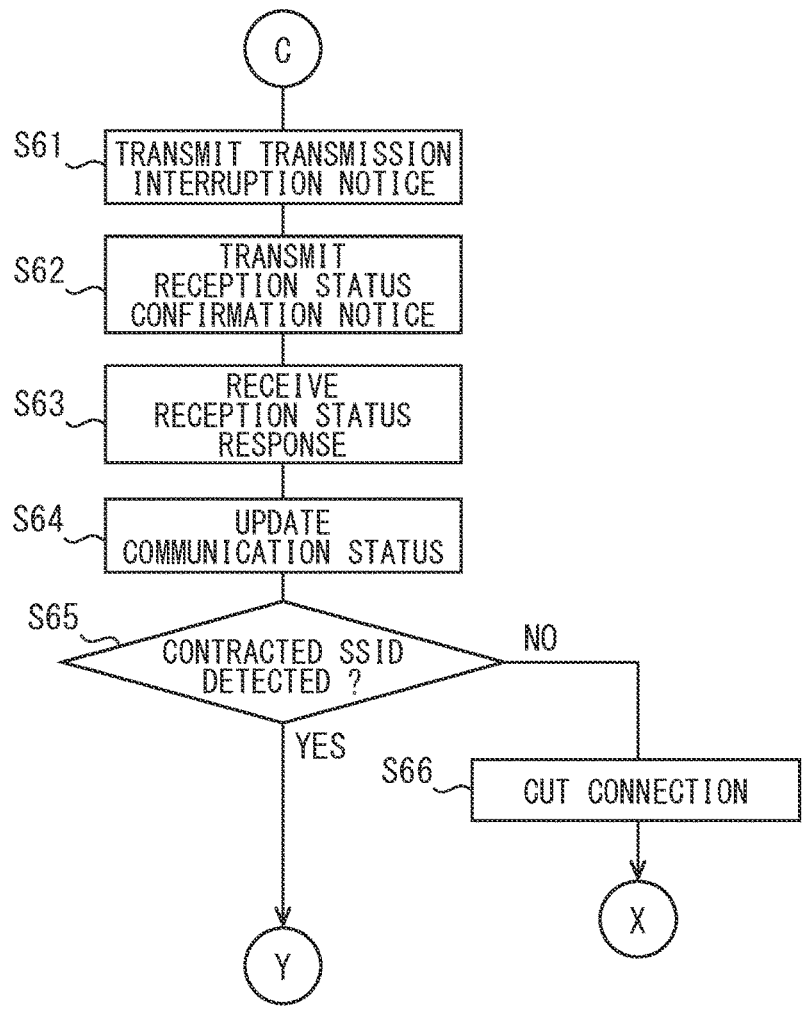
FIG. 8 is a flowchart showing an example of a flow of transmission interrupted time processing in the control unit.

Next, an example of the flow of processing when data transmission is interrupted due to cut or disconnection of the Wi-Fi line in the control unit 310 (hereinafter referred to as transmission interrupted time processing) is described with reference to the flowchart of FIG. 8. The flowchart of FIG. 8 is started following the processing of S30 of the data transmission related processing.

First, in step S61, the communication controller 312 causes the CL communication unit 350 to transmit a transmission interruption notice to the CS 2 using the cellular line. The transmission interruption notice may be a notice of transmission interruption regarding transmission of the transmission target data. By receiving the notice that clearly indicates that the transmission of the transmission target data has been interrupted, the CS 2 can perform resource management such as saving the received data from the RAM to the external storage device or the like.

In step S62, the communication controller 312 causes the CL communication unit 350 to transmit the reception status confirmation notice to the CS 2 using the cellular line in the same manner as in S41. In step S63, the communication controller 312 receives the reception status response via the CL communication unit 350, similarly to S42. In step S64, the control unit 310 updates the communication status stored in the MDB 372 in accordance with the reception status response received in S63, similarly to S43.

In step S65, the AP detector 311 detects the base station WBS of the Wi-Fi line. If the detected SSID of the base station WBS is the contracted SSID (YES in S65), the process returns to S7 of the server-state confirmation related processing, and repeats the processing. On the other hand, if it is not the contracted SSID (NO in S65), the process proceeds to step S66. In step S66, the communication controller 312 cuts the control connection between the CL communication unit 350 and the base station CBS, returns to S1 of the server-state confirmation related processing, and repeats the processing.

Summary of the First Embodiment

According to the configuration of the first embodiment, a cellular line different from the Wi-Fi line for data communication is used to perform communication control for a sharing of the communication status indicating the progress of data transmission between the wireless communication device 3 and the CS 2. Therefore, the communication status can be shared using the cellular line, which is stabler than the Wi-Fi line for data communication. Thus, even when the data communication on the Wi-Fi line is interrupted in the middle, it is possible to share the communication status by using the cellular line. As a result, it becomes easier to avoid problems due to the inability to share the communication status, and it is possible to suppress deterioration in reliability of communication. Thus, it is possible to suppress deterioration in reliability of communication while performing data communication on a Wi-Fi line, which has a lower communication cost and a higher data transfer efficiency than a cellular line. As a result, it is possible to reduce the communication cost and improve the data transfer efficiency while suppressing deterioration in reliability of communication when performing communication for a mobile body via the wireless network.

Further, according to the configuration of the first embodiment, data is transmitted on the Wi-Fi line at a rate equal to or less than the maximum transfer rate received from the CS 2 on the cellular line. Therefore, it is possible to transmit data on the Wi-Fi line while making it difficult for the communication to be cut. It should be noted that a configuration different from the above-described one may also be possible, in which, without receiving the maximum transfer rate from the CS 2 via the cellular line, data may be transmitted on the Wi-Fi line without considering such a maximum transfer rate.

Second Embodiment

In the first embodiment, the configuration in which the wireless communication device 3 is directly connected to the base station CBS is described as an example, but the configuration is not necessarily limited to the above. For example, the wireless communication device 3 may be configured to indirectly connect to the base station CBS via a mobile terminal (hereinafter referred to as the second embodiment). The following describes a detailed example of the second embodiment with reference to the accompanying drawings.

Figure 9:
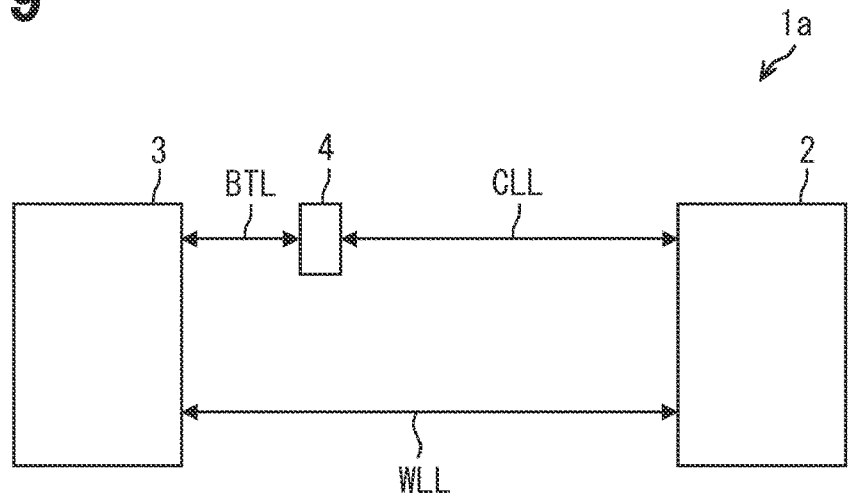
FIG. 9 is a diagram for explaining a schematic configuration of another vehicle communication system.

Here, a schematic configuration of a vehicle communication system 1a according to the second embodiment is described with reference to FIG. 9. As shown in FIG. 9, the vehicle communication system 1a includes a CS 2, a wireless communication device 3 and a portable terminal 4. The vehicle communication system 1a is the same as the vehicle communication system 1 of the first embodiment, except that the portable terminal 4 is included and the wireless communication device 3 communicates with the CS 2 via the portable terminal 4.

The portable terminal 4 is a terminal carried by the user of the vehicle HV. The portable terminal 4 is positioned in a vehicle compartment of the vehicle HV while the vehicle HV is traveling. As the portable terminal 4, a multifunctional mobile phone or the like can be used.

The wireless communication device 3 of the second embodiment indirectly connects to the base station CBS via the portable terminal 4. In the second embodiment, the wireless communication device 3 and the portable terminal 4 may be connected by highly stable short-range wireless communication (i.e., Bluetooth communication) according to the Bluetooth (registered trademark) standard. The portable terminal 4 may be connected to the base station CBS using cellular communication. In other words, the wireless communication device 3 may be connected to the base station CBS by the Bluetooth tethering function.

In the second embodiment, the wireless communication device 3 also uses both of the first line and the second line. In the second embodiment, the wireless communication device 3 also performs data communication on the first line and performs communication control on the second line. The first line in the second embodiment is assumed to be the same Wi-Fi line as exemplified in the first embodiment (see WLL in FIG. 9). On the other hand, the second line in the second embodiment is the Bluetooth communication line between the wireless communication device 3 and the portable terminal 4 (see BTL in FIG. 9) and the cellular line between the portable terminal 4 and the CS 2 (see CLL in FIG. 9). That is, part of the second line corresponds to the cellular line.

In the second embodiment, the CL communication unit 350 indirectly connects to the base station CBS via the portable terminal 4, and performs communication control with the CS 2 via the second line. Bluetooth communication between the wireless communication device 3 and the portable terminal 4 is highly stable in a state when the portable terminal 4 is brought into the vehicle HV. Therefore, even when the wireless communication device 3 indirectly connects to the base station CBS via the portable terminal 4, stable communication control is performable.

Even with the configuration of the second embodiment, as in the first embodiment, it is possible to reduce communication costs and improve data transfer efficiency while suppressing deterioration in communication reliability, in communication with a wireless network in a mobile body.

Third Embodiment

In the above-described embodiment, the configuration in which the wireless communication device 3 is used in a vehicle HV is described as an example, but the configuration is not necessarily limited to such one. The wireless communication device 3 may be configured to be used in a mobile body other than a vehicle. For example, the wireless communication device 3 may be configured to be used in a flying object such as a drone.

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure. Further, the controller and the method thereof described in the present disclosure may be implemented by a dedicated computer which includes a processor programmed to perform one or more functions executed by a computer program. Alternatively, the device and the method thereof described in the present disclosure may also be implemented by a dedicated hardware logic circuit or circuits. Alternatively, the device and the method thereof described in the present disclosure may also be implemented by one or more dedicated computers configured as a combination of a processor executing a computer program and one or more hardware logic circuits. The computer program may also be stored in a computer-readable, non-transitory, tangible storage medium as instructions to be executed by a computer.

What is claimed is:

1. A wireless communication control device for controlling a wireless communication device, the wireless communication device being configured to perform transmission and reception of data with a wireless network usable in a mobile body via wireless communication, by using a first line and a second line both connected to the wireless network with respectively different communication methods, the wireless communication control device comprising:
   a data communication processor configured to transmit data on the first line;
   a communication controller configured to perform, on the second line, communication control for a sharing of a communication status that indicates a progress of data transmission between a transmission source and a transmission destination of the data communication; and
   an interruption detector configured to detect interruption of data transmission performed on the first line by the data communication processor, wherein
   the communication controller is configured to, in response to the interruption detector detecting the interruption of data transmission on the first line:
      (i) send a notice, using the second line, to the transmission destination of the data for confirmation of a reception status of the data, and
      (ii) receive a reception status response from the transmission destination of the data as the communication status to identify remaining data not yet received by the transmission destination, and
   the data communication processor is configured to transmit the remaining data to the transmission destination of the data using the first line in response to the data transmission using the first line becoming restartable.

2. A wireless communication device usable in the mobile body for connecting to the wireless network via wireless communication and for transmitting and receiving data, the wireless communication device being capable of establishing connection to the wireless network either by using the first line or the second line performing respectively different communication methods, the wireless communication device comprising:
   the wireless communication control device according to claim 1;
   wherein the wireless communication device is configured to connect to the wireless network using the first line and to the wireless network using the second line.

3. A wireless communication control method performable by at least one processor and usable in a mobile body, for controlling a wireless communication device, the wireless communication device being configured to (i) use first and second lines that are different for a connection to a wireless network and (ii) to transmit and receive data to and from the wireless network via wireless communication, the wireless communication control method comprising:
   performing data communication as data transmission on the first line; and
   performing a communication control for a sharing of a communication status indicating a progress of data transmission between a transmission source and a transmission destination of the data communication, on the second line;
   detecting interruption of data transmission performed on the first line;
   in response to the interruption of data transmission being detected,
      (i) sending, using the second line, a notice to the transmission destination of the data for confirmation of a reception status of the data; and
      (ii) receiving a reception status response from the transmission destination of the data as the communication status to identify remaining data not yet received by the transmission destination; and transmitting, using the first line, the remaining data in response to the data transmission on the first line becoming restartable.

4. The wireless communication control device according to claim 1, wherein the communication controller is further configured to confirm a connection on the first line, the interruption detector is configured to detect a disconnection or deterioration of the first line, the data communication processor is configured to:

stop transmitting the data using the first line in response to the interruption detector detecting the disconnection or deterioration of the first line, and transmit the remaining data using the first line in response to the communication controller confirming the connection on the first line.

5. The wireless communication control method according to claim 3, wherein the detecting the interruption of data transmission includes detecting a disconnection or deterioration of the first line, the wireless communication control method further comprises:

confirming a connection on the first line, stopping transmission of the data using the first line in response to detecting the disconnection or deterioration of the first line, and transmitting the remaining data using the first line in response to confirming the connection on the first line.

6. The wireless communication control device according to claim 1, wherein the communication controller is configured to inquire, using the second line, of a server whether the server is able to perform communication, and the data communication processor is configured to transmit data on the first line based on the server being able to perform communication.

7. The wireless communication control device according to claim 1, wherein the communication controller is configured notify, using the second line, the transmission destination of interruption of data transmission performed on the first line in response to the interruption detector detecting the interruption of data transmission.

8. The wireless communication control device according to claim 1, wherein a range connectable to the wireless network using the second line is broader than a range connectable to the wireless network using the first line.

9. The wireless communication control device according to claim 1, wherein the second line is a line with a stable communication state compared to the first line, and the first line is a line with a lower communication unit price than the second line.

10. The wireless communication control device according to claim 1, wherein the second line is a line using a communication protocol capable of performing at least one of arrival confirmation and error correction, and the first line is a line using a communication protocol with higher data transfer efficiency than the second line.

11. The wireless communication control device according to claim 1, wherein the second line is either a line for cellular communication or a line partially including a line for cellular communication, and the first line is a line for a wireless LAN.

\* \* \* \* \*